(12) United States Patent
Rankin et al.

(10) Patent No.: US 12,499,147 B1
(45) Date of Patent: *Dec. 16, 2025

(54) ENTITY RECORD FILTERING TECHNIQUES

(71) Applicant: THE HUNTINGTON NATIONAL BANK, Columbus, OH (US)

(72) Inventors: Shaun Rankin, Columbus, OH (US); Mamatha Pasangulapati, Columbus, OH (US); Robert M. Maupin, Columbus, OH (US); Bhagya Sandhya Devi Kopparaju, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,813

(22) Filed: Dec. 23, 2024

Related U.S. Application Data (63) Continuation of application No. 18/985,146, filed on Dec. 18, 2024.

(51) Int. Cl.
*G06F 16/00* (2019.01)
*G06F 16/353* (2025.01)
*G06F 40/295* (2020.01)

(52) U.S. Cl.
CPC .......... *G06F 16/353* (2019.01); *G06F 40/295* (2020.01)

(58) Field of Classification Search
CPC . G06Q 10/063114; H04L 51/046; G06F 1/00; G06F 3/00; G06F 7/00; G06F 9/00; G06F 12/00; G06F 16/00; G06F 18/00; G06F 40/00; G06F 8/00; G06F 16/215; G06F 16/285; G06F 16/245; G06F 16/2246; G06F 16/24; G06F 16/2455; G06F 16/282; G06F 16/35; G06F 16/951; G06F 16/93; G06F 16/13; G06F 16/353; G06F 40/166; G06F 16/23; G06F 16/22
See application file for complete search history.

(56) References Cited

U.S. PATENT DOCUMENTS

| | | | |
|---|---|---|---|
| 10,026,114 B2 * | 7/2018 | Tolvanen | G06Q 30/0631 |
| 11,947,504 B1 | 4/2024 | Shah et al. | |
| 2018/0144095 A1 * | 5/2018 | Fellowes | G16H 10/60 |

OTHER PUBLICATIONS

U.S. Appl. No. 18/985,146, "Non-Final Office Action", May 6, 2025, 13 pages.

* cited by examiner

*Primary Examiner* — Shyue Jiunn Hwa
(74) *Attorney, Agent, or Firm* — Kilpatrick Townsend & Stockton LLP (57) ABSTRACT

In some implementations, the techniques may include accessing entity data that identifies one or more updates to a set of entity records, and ach entity record may include a plurality of fields. In addition, the techniques may include generating a graphical user interface that displays the plurality of fields. The techniques may include causing the graphical user interface to be displayed on a display device. Moreover, the techniques may include receiving information for identifying a subset of entity records from the set of entity records via the user interface. The information for identifying the subset of entity records may include information identifying one or more fields of the plurality of fields. Also, the techniques may include generating the subset of entity records from the set of entity records. Further, the techniques may include causing the subset of entity records be communicated to a computer system.

20 Claims, 8 Drawing Sheets

ENTITY RECORD FILTERING TECHNIQUES

CROSS-REFERENCE TO RELATED APPLICATIONS

This application is a continuation of U.S. patent application Ser. No. 18/985,146, filed Dec. 18, 2024, the entirety of which is hereby incorporated by reference.

TECHNICAL FIELD

The disclosure is generally directed to machine learning models. Specifically, the disclosure is directed to techniques for generating input to machine learning models.

BACKGROUND

Entity records can be clustered by a machine learning model to identify related entities. The machine learning model can use the entity records to determine which entities are related, and the model can group these related entities into clusters. However, clustering entity records can be computationally demanding, and days of processing may be required to cluster entity records. These models may execute on server computers, and input to these models are sent over network connections. Accordingly, improvements to filter the input to clustering models are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, techniques may include accessing entity data, where the entity data identifies one or more updates to a set of entity records. The techniques may also include generating a set of changed entity records from the set of entity records, where the set of changed entity records are generated based at least in part on the entity data. The techniques may furthermore include for each entity record in the set of changed entity records: identifying at least one updated field of a first entity record of the set of changed entity record; identifying at least one common field of the first entity record and one or more second entity records, where the first entity record and the one or more second entity records are associated with a first cluster based at least in part on a number of common fields; comparing the at least one updated field of the first entity record and at least one corresponding field of the one or more second entity records to determine whether there is a change to the number of common fields; and communicating the first entity record and the second entity record to a computer system based at least in part on the number of common fields.

In addition, implementations may include one or more of the following features. Techniques where a first field of the at least one updated field of the first entity record and a second field of the one or more second entity records are a common field if a threshold number of characters in the first field and the second field overlap. Techniques where the at least one common field may include one or more of an address field, an account field, and an email address field. Techniques that include: receiving, from the computer system, information indicating that the first entity record is associated with a second cluster. Techniques that include: receiving, from the computer system, information indicating that at least one of the one or more second entity records are associated with a third cluster. Techniques where the set of changed entity records are generated at twenty-four (24) hour intervals. Techniques where the set of changed entity records may include at least ten thousand (10,000) entity records.

In one general aspect, techniques may include accessing entity data. The entity data can identify one or more updates to a set of entity records, and each entity record may include a plurality of fields. The techniques may also include generating a graphical user interface that displays the plurality of fields. The techniques may furthermore include causing the graphical user interface to be displayed on a display device. The techniques may in addition include receiving information for identifying a subset of entity records via the user interface. The information for identifying the subset of entity records may include information identifying one or more fields of the plurality of fields. The techniques may moreover include generating the subset of entity records from the set of entity records. The techniques may also include causing the subset of entity records be communicated to a computer system.

Implementations may include one or more of the following features. Techniques where each entity record of the set of entity records is assigned to a cluster of a plurality of clusters. Techniques where each cluster of the plurality of clusters corresponds to a mailing address. Techniques where generating the subset of entity records may include, for each cluster: comparing the one or more fields of the plurality of fields for each entity record of the cluster to determine a number of changed entity record fields for the cluster; and adding the cluster to the subset of entity records based on the comparing. Techniques where the information identifying the one or more fields of the plurality of fields further may include a threshold for each field. The threshold can be a number of overlapping characters or a percentage of overlapping characters. Techniques where comparing the one or more fields of the plurality of fields for each entity record further may include, for each pair of entity records in the cluster: determining a number of overlapping characters for each of the one or more fields to determine a number of common fields; and adding the cluster to the subset of entity records based on the number of common fields. Techniques where adding the cluster to the subset of entity records may include: determining that the number of common fields is less than a common field threshold.

Implementations of these techniques can include corresponding methods, computer systems, apparatus, and computer programs recorded on one or more transitory or non-transitory computer storage devices (e.g., computer readable media), each configured to perform the actions of the techniques.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to techniques for clustering entity records. Entity records can be clustered by inputting information about the records into a trained machine learning model. The machine learning model can use the input information to determine whether any of the records are related records that should be grouped as a cluster. The information about an entity record can be represented as an ordered list of numeric representations of the record's properties (e.g., an n-dimensional feature vector). The machine learning model can determine relationships between entity records by plotting the feature vectors in an n-dimensional embedded space (e.g., feature space) where each axis in the space corresponds to one of the record's n properties. Records are similar (e.g., related) if they are separated by a short distance in feature space, and records may be dissimilar (e.g., unrelated) if the records are far apart in feature space (e.g., the Euclidian distance is far apart).

An organization may use a computer system to collect, store, and process entity records. This record system can select a subset of the available entity records for input to a machine learning model. For example, the record system may select records that have been updated within a period of time (e.g., 24 hours). The system may communicate the subset of records to a machine learning model that is executing within the record system or on a remote computing device. The record system may generate feature vectors, and the subset of records can be communicated to the machine learning model as feature vectors in some embodiments.

Clustering entity records can be computationally demanding for the record system. For example, a feature vector may need to be generated for each clustered entity. The machine learning model performing clustering may be hosted on a remote server, and providing the feature vectors to a model may mean that the vectors are transmitted over a network connection to the server. The feature vectors can be input to the model, and the model can cause the server to perform iterative operations in order to determine cluster assignments.

In some implementations, the number of operations performed by the model can increase exponentially as the number of feature vectors that are input to the model increases. For example, clustering millions of entity records can require over 24 hours of processing, but processing tens of thousands of entity records can be clustered in 30 minutes, 1 hour, 2 hours, 3 hours, or 4 hours. The network traffic has been reduced from tens of millions of records a month to less than a million records being sent over the network connection. For example, the network traffic has been reduced from 75 million records a month to 0.6 million records a month. The reduction in network traffic also resulted in reduced storage requirements. Accordingly, the functioning of a computer system can be improved by reducing the amount of data that is to be clustered.

The amount of data that is provided as input to a machine learning model can be reduced by filtering the entity records. Rather than providing the records for all of the entities to the machine learning model, the records can be filtered to limit the input to the model. In some implementations, the records can be filtered to identify records that have been changed since the last clustering. The amount of processing performed by the machine learning model increases logarithmically with the size of the input because the model determines the similarity of each unique pair of entity records. Therefore, reducing the amount of input decreases the number of operations performed by the computer system hosting the model and the amount of time required to perform the clustering.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 1:
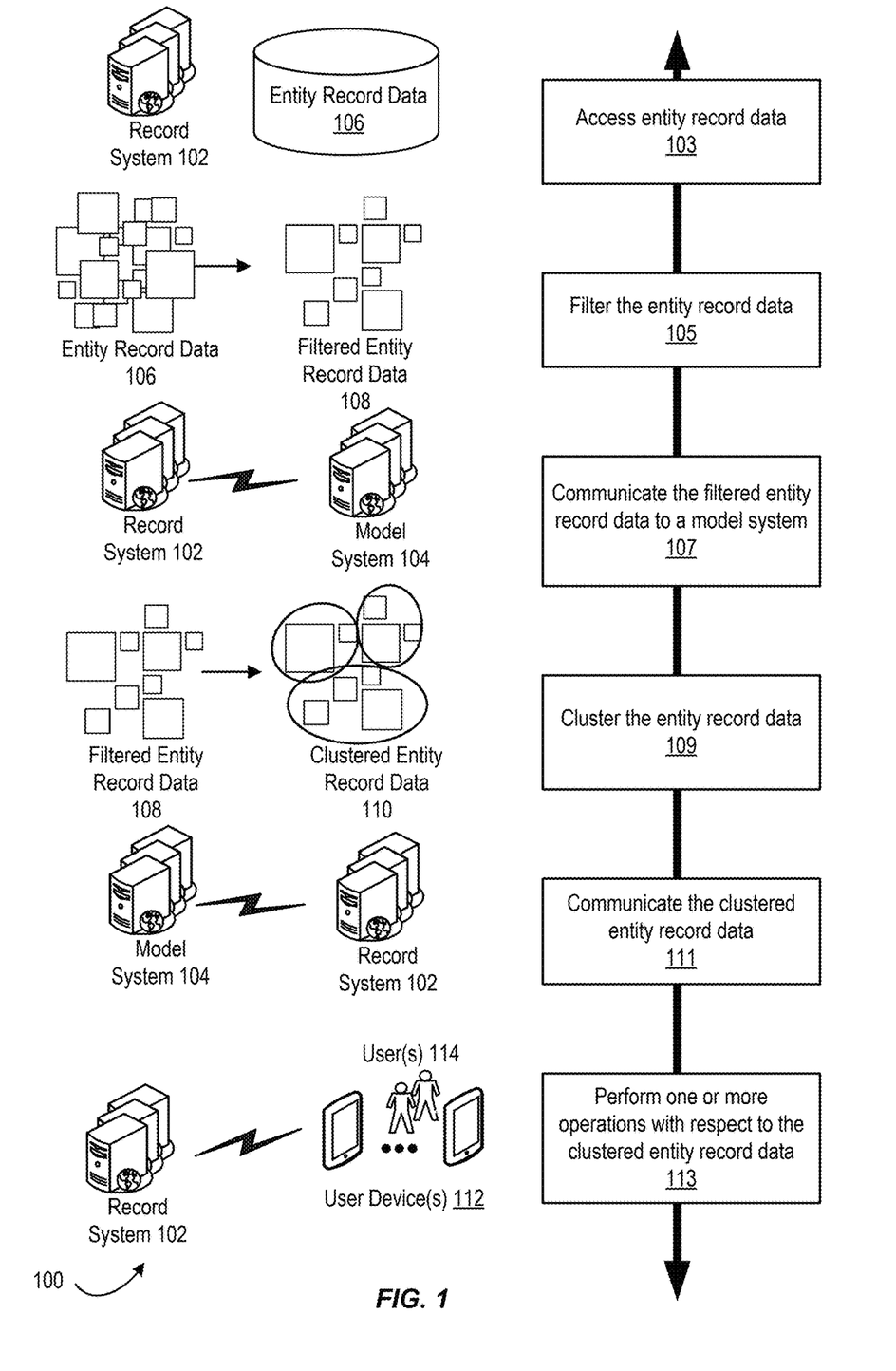
FIG. 1 is an example flow for filtering and clustering entity record data, in accordance with at least one embodiment.

Moving on to FIG. 1 which illustrates an example flow 100 for entity record data clustering accordance with at least one embodiment. The operations discussed in connection with FIG. 1 may be performed with any combination of a Record System 102 and a Model System 104. In some embodiments, any combination of Record System 102 and Model System 104 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at 103, the Record System 102 can access entity records data 106. Each record in the entity record data 106 may correspond to a human person or a legal entity that is associated with an organization (e.g., a business). For example, the Record System 102 may store an entity record for each customer of an organization. The record system may manage the entity records data 106 by creating or updating the entity records. For example, the organization can be a bank and the record system 102 may ingest information about tens of thousands of transactions from thousands of bank branches on a daily basis. The ingested data can be processed to determine whether the records system should create a new entity record, update an existing entity record, or perform no action in response to each datum of the ingested data. Each entity record in the entity record data 106 can be a row in a table and the entity record can include one or more fields (e.g., columns in the row).

At 105, the record system 102 can filter the entity record data 106 to generate filtered entity records data 108. The record system 102 may perform this filtering at regular intervals (e.g., daily) and the records system may filter the data by removing entity records that were not updated during the interval. For example, the entity records can include a "update field" that records the day and/or time of the last update to the record. The filtered entity records data 108 can include updated entity records and new entity records, and, in some embodiments, the filtered entity records data 108 can include records that are associated with the new or updated entity records. For example, the associated records can be records that are part of the same cluster or records that share a sufficient number of common fields.

A field can include an ordered set of alphanumeric characters, and two fields can be a common field if a threshold number (or percentage) of the ordered characters in two or more fields overlap. The threshold number can be 4 characters, 5 characters, 10 characters, 15 characters, 20 characters in some embodiments. In some embodiments, the threshold percentage can be 50% overlap, 60% overlap, 75% overlap 80% overlap, 90% overlap, 95% overlap and 100% overlap. The thresholds may be different for different fields (e.g., two account number fields may be common fields if there is 100% overlap). In some embodiments, only certain fields may potentially be common fields. For example, the potential common fields can include a mailing address, an email address, an account number, a full name, and a business name.

The Record System 102 can add a value to this "update field" when the system creates or updates an entity record. In some embodiments, the entity records can include a "version field" that increments at each successive interval. For example, all records that are updated or created during the first interval are version "1", all records that are updated during the second interval are version "2", and all records that are updated during the nth interval are version "n". In some embodiments, the update field can be a Boolean identifier (e.g., "1" for new or updated and "0" for existing records) and the record system 102 can reset all records to "0" after filtering.

The Record System 102 can use the update field to create a subset of filtered entity records data 108 from the entity records data 108. The filtered entity records data 108 can be substantially smaller than the entity records data 106. For example, the entity records data 106 can include 15,000,000 entity records, and the filtered entity records data 108 can be 20,000 entity records. In various embodiments, the number of entries in the filtered entity records data 108 can be 10%, 5%, 1%, 0.5% and 0.1% of the number of entries in the entity records data 106.

At 107, the Record System 102 can communicate the filtered entity records data 108 to the model system 104. The filtering at 105 can mean that only a subset of the entity records data 106 are communicated to the model system 104 as filtered entity records data 108. The data can be communicated over a network connection, and the filtering at 105 can improve the functioning of a computer system because fewer entity records are sent over the network connection, and the model system 104 can use less memory to store the filtered entity records data 108.

At 109, the model system 104 can cluster the filtered entity records data 108. The filtered entity records data 108 can be clustered by providing the data as input to a trained machine learning model that is executing on computing hardware associated with the model system 104. Feature vectors may be generated for the filtered entity records data 108 by the model system 104. In some embodiments, feature vectors may be generated for the filtered entity records data 108 by the Record System 102 and the feature vectors may be communicated at 107. The feature vectors can be provided as input to the machine learning model and the model can output a classification for each feature vector.

At 111, the model system 104 can communicate the clustered entity record data to the Record System 102. The clustered entity record data can be communicated over a network connection such as the internet. In some embodiments, the clustered entity record data may be filtered before the data is communicated. For example, the clustered entity record data may be filtered by removing data for entity records that did not were not grouped into a new cluster (e.g., at least one entity record is added or removed from the cluster). In some embodiments, all entity records that are input to a machine learning model may receive a new cluster identifier.

At 113, one or more operations can be performed with respect to the clustered entity record data. For example, the Record System 102 may use the clustered entity record data that was received at 111 to send a message to user device(s) 112 or user(s) 114. A user can be a physical person, a legal entity, or a digital avatar of a physical person or legal entity. The message may be sent as an electronic message such as an email or a short messaging service (SMS) message.

In some embodiments, each cluster can be associated with a physical mailing address and the operations can be to print documents that are to be distributed to the addresses via a post or mail system. For example, the operations with respect to the clustered entity record data can be instructions to update a distribution list for mailed documents, and the update to the distribution list can trigger an automated process to print addressed envelopes for some or all of the addresses in the distribution list. Accordingly, the disclosed techniques can improve the operations of a computer system by reducing the amount of printed material that is sent to an incorrect address. Such techniques can improve the organization's security by reducing the amount of information that is distributed to an incorrect address.

Figure 2:
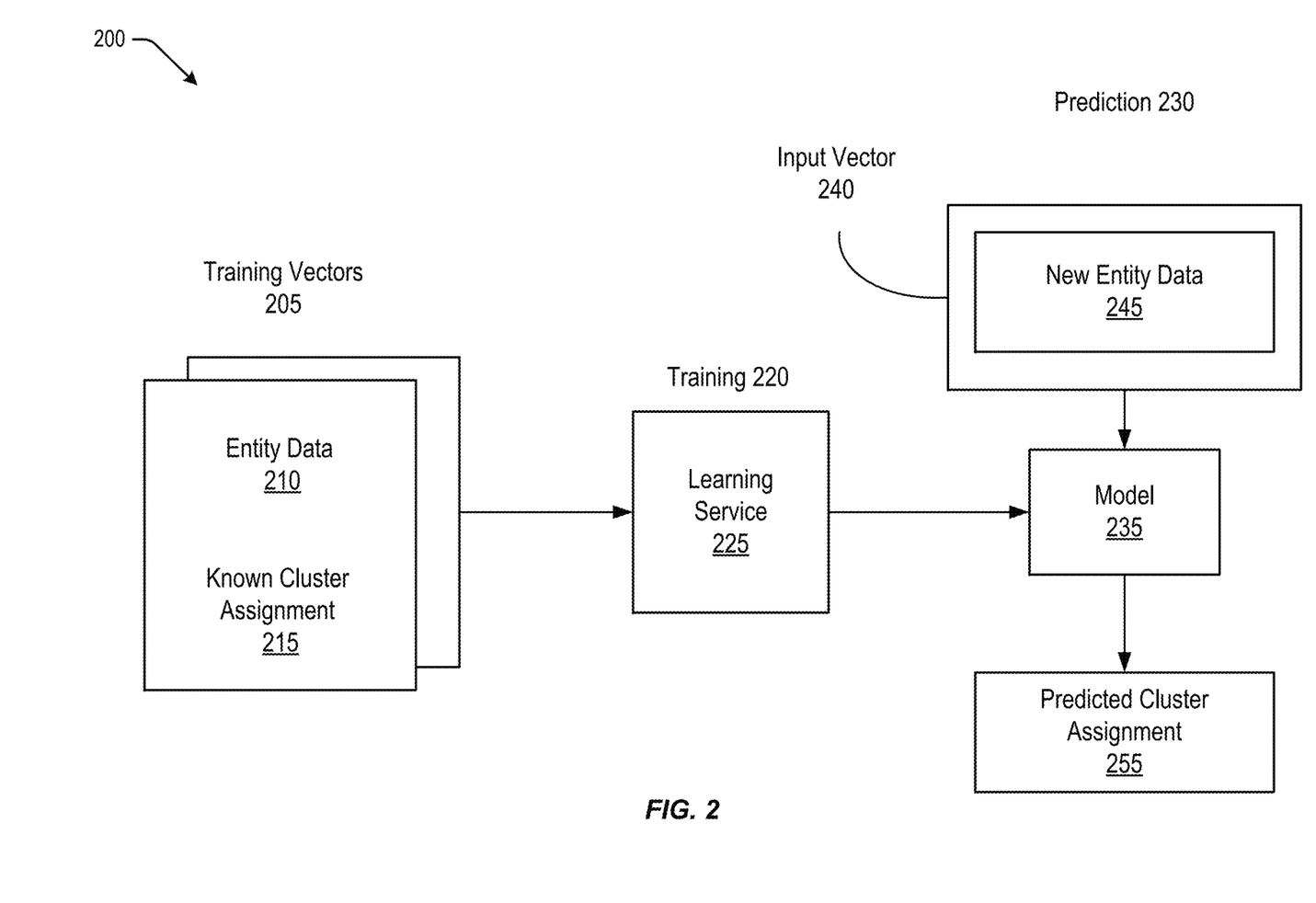
FIG. 2 shows a technique for training a machine learning model according to at least one embodiment.

FIG. 2 depicts an architecture for training a machine learning model according to the embodiments of the present disclosure. This architecture can be part of the model system 104 described above with respect to FIG. 1. The machine learning model can be trained to classify entity data as corresponding to a particular cluster as described above in step 109. Training vectors 205 are shown with entity data 210 and a known cluster assignment 215. Entity data 210 can include any information about entity record data as described herein. For ease of illustration, only two training vectors are shown, but the number of training vectors may be much larger, e.g., 10, 20, 100, 1,000, 10,000, 100,000, or more. Training vectors (e.g., feature vectors) could be made for any combination of different entities over the same time period, the same entity over different time periods.

Entity data 210 have property fields that can correspond to the entity record data received at the record system (e.g., record system 400) during a time period and the skilled person will appreciate the various ways that such data can be configured. Known cluster assignment 215 include the cluster assignment (e.g., information identifying associated entity records) at a fixed number of intervals after the cluster assignment or manually labeled cluster assignments. For example, a message can be sent to an email address or phone number associated with entity record and the message can ask for confirmation that the entity is associated with the other entities in the cluster. In various embodiments, the interval can be 30 minutes, 1 hour, 90 minutes, 2 hours, 3 hours, 4 hours, 6 hours, 8 hours, 12 hours, 18 hours, 24 hours, 36 hours, 2 days, 3 days, 4 days, 5 days, 6 days, 1 week, and 2 weeks.

Training vectors 205 can be used by a learning service 225 to perform training 220. A service, such as learning service 225, being one or more computing devices configured to execute computer code to perform one or more operations that make up the service. Learning service 225 can optimize parameters of a model 235 such that a quality metric (e.g., accuracy of model 235) is achieved with one or more specified criteria. The accuracy may be measured by comparing known cluster assignments 215 to predicted cluster assignments 255. Parameters of model 235 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or that the cost function does not change significantly for several time steps, as examples. In other embodiments, training can be implemented with methods that do not require a hessian or gradient calculation, such as dynamic programming or evolutionary algorithms.

A prediction stage 230 can provide a predicted cluster assignment 255 for a new entity's entity signature vector 240 based on new entity data 245. The predicted cluster assignment 255 can be one or more entity records that are predicted as being associated with the entity corresponding to the input vector 240 (e.g., the entities share the same physical address). The new entity data 245 can be of a similar type as entity data 210. If new entity data 245 values are of a different type, a transformation can be performed on the data to obtain data in a similar format as entity data 210. Ideally, predicted cluster assignment 255 corresponds to the true cluster assignment for input vector 240.

A "machine learning model" (ML model) can refer to a software engine configured to be run on one or more processors to provide a classification or numerical value of a property of one or more samples. An ML model can be generated using sample data (e.g., training data) to make predictions on test data. One example is an unsupervised learning model. Another example type of model is supervised learning that can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 3:
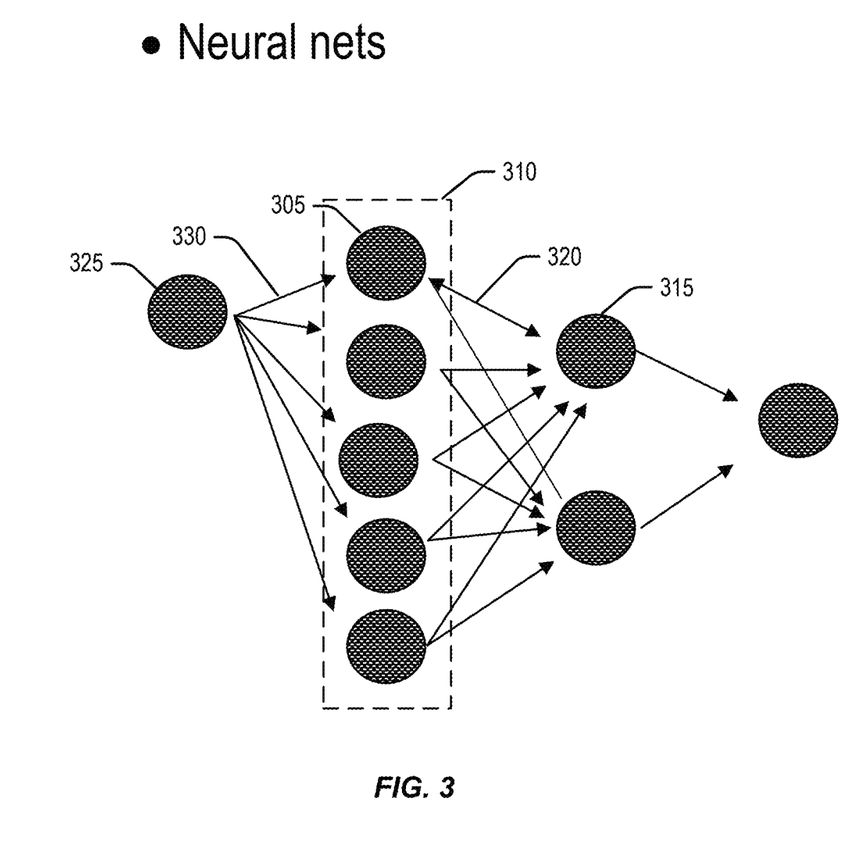
FIG. 3 shows an example machine learning model of a neural network according to at least one embodiment.

FIG. 3 shows an example machine learning model of a neural network, according to at least one embodiment. As an example, model 335 can be a neural network that includes a number of neurons (e.g., Adaptive basis functions) organized in layers. Model 335 can be an example of a machine learning model that can be trained using architecture 200. For example, neuron 305 can be part of layer 310. The neurons can be connected by edges between neurons. For example, neuron 305 can be connected to neuron 315 by edge 320. A neuron can be connected to any number of different neurons in any number of layers. For instance, neuron 305 can be connected to neuron 325 by edge 330 in addition to being connected to neuron 315.

The training of the neural network can iteratively search for the best configuration of the parameter of the neural network for feature recognition and prediction performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information and each node iteratively updates its representation based on the passed information.

Figure 4:
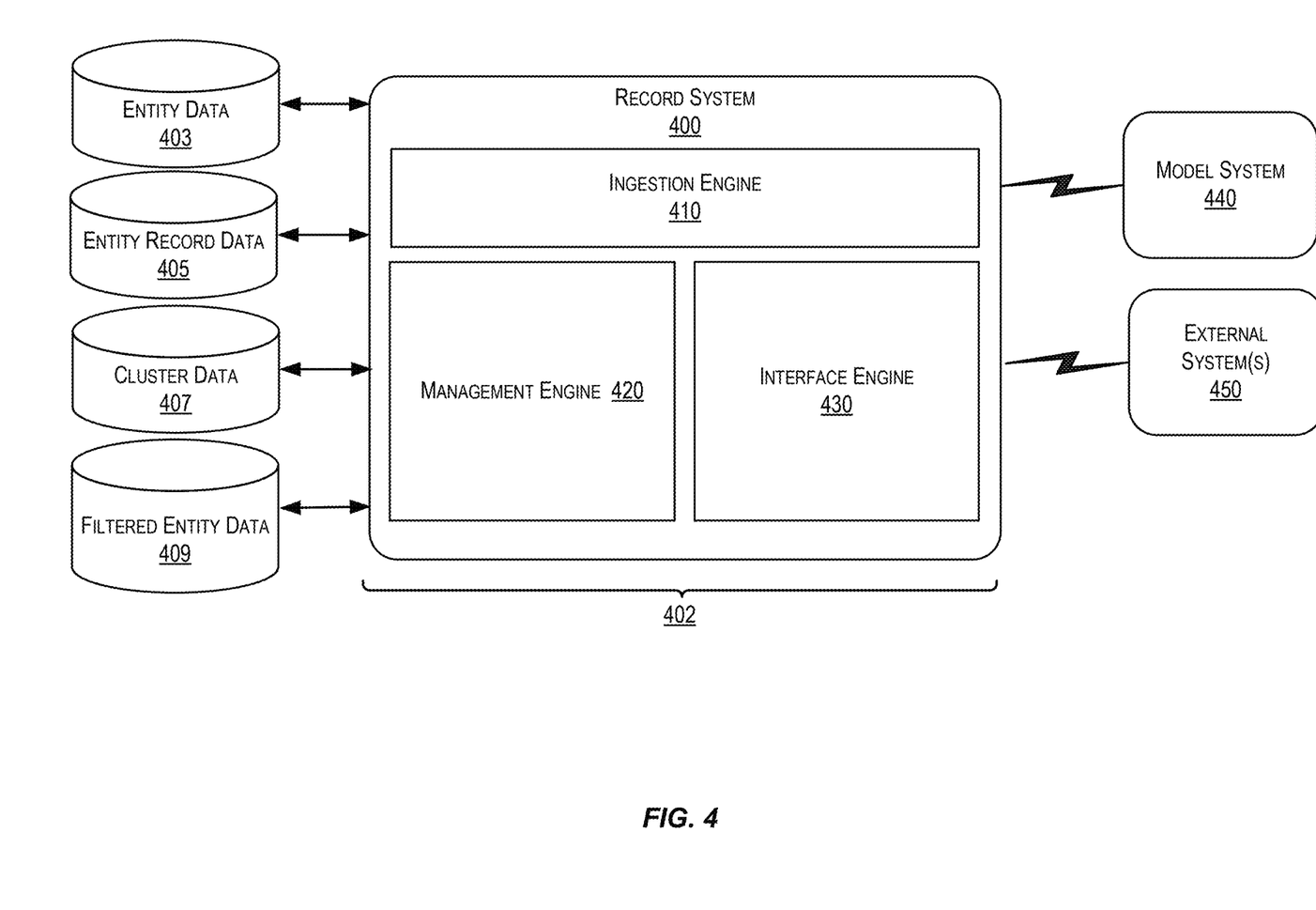
FIG. 4 is a schematic diagram of an example computer architecture for the record system, including a plurality of engines that may perform functions in accordance with at least one embodiment.

FIG. 4 is a schematic diagram of an example computer architecture for the record system 400, including a plurality of engines that may perform functions in accordance with at least one embodiment. The engines may be software engines, hardware engines, or a combination thereof. If the engines are software engines, the engines can be embodied on a computer readable medium and processed by a processor in any of the computer systems described herein. It should be noted that any engine or data store described herein, may be, in some embodiments, be a service responsible for providing functionality corresponding to the engine described below. The engines 402 may be execute as part of the record system 400, or the engines 402 may exist as separate engines or services external to the record system 400. record system 400 is an example of the Record System 102. In some embodiments, the engines 402 may be executed by the same or different computing devices, as a service, as an application, or the like.

In the embodiment shown in the FIG. 4, data stores such as entity data 403, entity record data 405, cluster data 407, and filtered entity data 409 are shown, although data can be maintained, derived, or otherwise accessed from various data stores, either remote or local to the record system 400, to achieve the functions described herein. The record system 400, as shown in FIG. 4, includes various engines such as an ingestion engine 410, a management engine 420, and an interface engine 430. The Record System can communicate information to and from a Model System 440 and/or External System(s) 450. Some functions of the engines 410-430 and systems 440-450 are described below. However, for the benefit of the reader, a brief, non-limiting description of each of the engines and systems are provided in the following paragraphs. In accordance with at least one embodiment, a process for filtering and communicating entity record data is provided.

In at least one embodiment, the record system 400 includes the ingestion engine 410. Generally, the ingestion engine 410 may be utilized to receive any suitable information with respect to any example provided herein. By way of example, the ingestion engine 410 may be configured to receive information about entities. The entity data may be received as it is generated in a continuous stream of data corresponding to the creation of new entities or updates to information for entities. In some embodiments, the entity data may be received in periodic batches. If necessary, the raw data may be stored as entity data 403 and accessed by the ingestion engine 410. The entity data can be received from one or more system(s) that are associated with the organization or one or more external organizations. For example, the organization can be a bank and information about new account holders, or changing to existing account holders, may be received from thousands of local bank branches and an online banking service. The stream can be received over a network such as the internet.

The ingestion engine 410 may ingest the entity data by cleaning, processing, or otherwise transforming the entity data 403, and the ingestion engine 410 can use the ingested entity data to update or create new entity record data 405. Ingesting the entity data 403 can include removing duplicate data, changing data from one format to another (e.g., changing a date from mm/dd/yyyy to yyyy-mm-dd), completing incomplete data entries, correcting corrupted data entries, removing unnecessary data, or otherwise making the entity data 403 suitable for use by the other engines 402.

To update the entity record data 405, the ingestion engine 410 may update one or more individual records, or create new records, in the entity record data 405. Updating an entity record can mean that the ingestion engine 410 changes a value of one or more fields in an entity record within entity record data 405. The ingestion engine 410 can assign a change time to each entity record in the entity record data 405. The change time can be the time at which a field in the record is changed, or a record is created, by the ingestion engine 410.

The ingestion engine 410 may update a change time, or change the entity record's version, only if certain fields are updated. For example, the fields may include fields for one or more account numbers, a first name, a last name, a street address, a city, a state, a country, a zip code, one or more phone numbers, and one or more email addresses. The ingestion engine 410 may update the change time (or version number) if there is an update to the street address field, but the change time may not be updated if there is a change to the middle name field. The change time or version number may only be updated by the ingestion engine 410 if a threshold number of fields are changed.

In at least one embodiment, the record system 400 includes the management engine 420. Generally, the management engine 420 may be utilized to organize and associate the entity record data 405. For example, the management engine 420 can use the entity data to create or update (e.g., change) the entity record data 405, and the management engine 420 can sort the records into sets or subsets of event records based on any applicable criteria. For example, the management engine can create sets of event records that include records that were changed during a specified time period (e.g., filtered entity data 409). The sets or subsets of event records can be stored as filtered event data 409. The management engine 420 may filter changed entity records based on which fields in the entity record are changed.

A set of changed event records can include event records that are associated with the changed event records, and the associated event records may be included even if the associated records are not themselves changed. Creating a set of changed event records can mean that the management engine 420 identifies associated event records using cluster data 407. The cluster data 407 can include a mapping of information identifying event records to information identifying a cluster (e.g., a cluster identifier). In some embodiments, the entity record data 405 can include a cluster field that includes the cluster data 407.

The management engine 420 can use the change time assigned by the ingestion engine 410 to create subsets of the entity records data 405 that correspond to particular time periods. For example, the management engine 420 can retrieve a set of entity records from the entity record data 405 using any combination of the update time fields, version fields, and cluster data 407. The management engine 420 can then create the subsets of data by using the update time fields in the event data to filter the retrieved set of event data into subsets of event data for particular time periods.

In at least one embodiment, the record system 400 includes the interface engine 430. Generally, the interface engine 430 may be utilized to generate graphical user interfaces, provide the graphical user interfaces to client devices (e.g., to client software or in a browser), provide output to the graphical user interfaces, and receive input from the graphical user interfaces. The interface engine 430 can be used to provide notifications to one or more client devices and to generally perform one or more operations with respect to the event data in record system 400. The interface engine can communicate with systems outside the record system 400.

A graphical user interface can be generated to display requested event data. For example, the interface engine 430 can receive a request from a user. The request can be a request for entity record data 405 or filtered entity record data 409. The interface engine 430 can provide the information in the request to the management engine 420, and the management engine can retrieve the entity record data (e.g., subsets or sets of entity record data) in response to the request.

The request may be for any subset of entity records and the management engine 420 can use one or more fields in the entity records to create the sets or subsets of entity records (e.g., the filtered entity data 409). For example, the request can be for entity records with one or more account types (e.g., checking, saving, loan, mortgage etc.), entity records with a specified account age (e.g., 1 month old, at least five years old), entity records for a particular geographic area (e.g., zip code, city, state, etc.), and entity records that are part of a particular cluster size (e.g., entity records with 4 or more associated entity records). The management engine 420 can identify and retrieve the subsets from ingested entity record data 405 using cluster data 407.

The interface engine 430 can generate a user interface for displaying the requested subsets of event data in the order determined by the management engine 420. The interface engine can communicate the sets or subsets of entity records to one or more systems outside of the record system 400. For example, the interface engine 430 can communicate the sets or subsets of entity records to Model System 440 or External System(s) 450.

In at least one embodiment, the record system 400 can communicate with a Modeling System 440. Generally, the Modeling System 440 can be used to compare event data to one or more rules, to train a machine learning model, or to use a machine learning model to classify event data. For example, the Modeling System 440 can request and receive one or more subsets of entity records from the management engine 420 via the interface engine 430.

The Modeling System 440 can determine cluster assignments with one or more machine learning models. A feature vector can be generated for each entity record. For example, the feature vector for an entity record can include numeric representations of any combination of the record's fields. As described above, the feature vectors can be used to train a machine learning model or to receive a classification (e.g., a cluster assignment) for the entity record represented by the feature vector. An entity record may be associated with one or more clusters in various embodiments.

In at least one embodiment, the record system 400 can communicate with an External System 450. For example, an External System 450 can be an automated mail service that prints and addresses parcels for distribution by a mail service. Accordingly, the External System 450 may be used to send advertising, account information, replacement cards, to entities associated with an organization associated with the record system 400. A cluster (e.g., associated entity records) may correspond to a single physical address and the cluster data 407 may be used to reduce the number of parcels that are mailed by the External System 450 in some embodiments (e.g., by mailing one parcel to each cluster). The External System 450 may be an electronic mail system in some embodiments. The external systems can include user devices in some embodiments (e.g., user devices 112).

Figure 5:
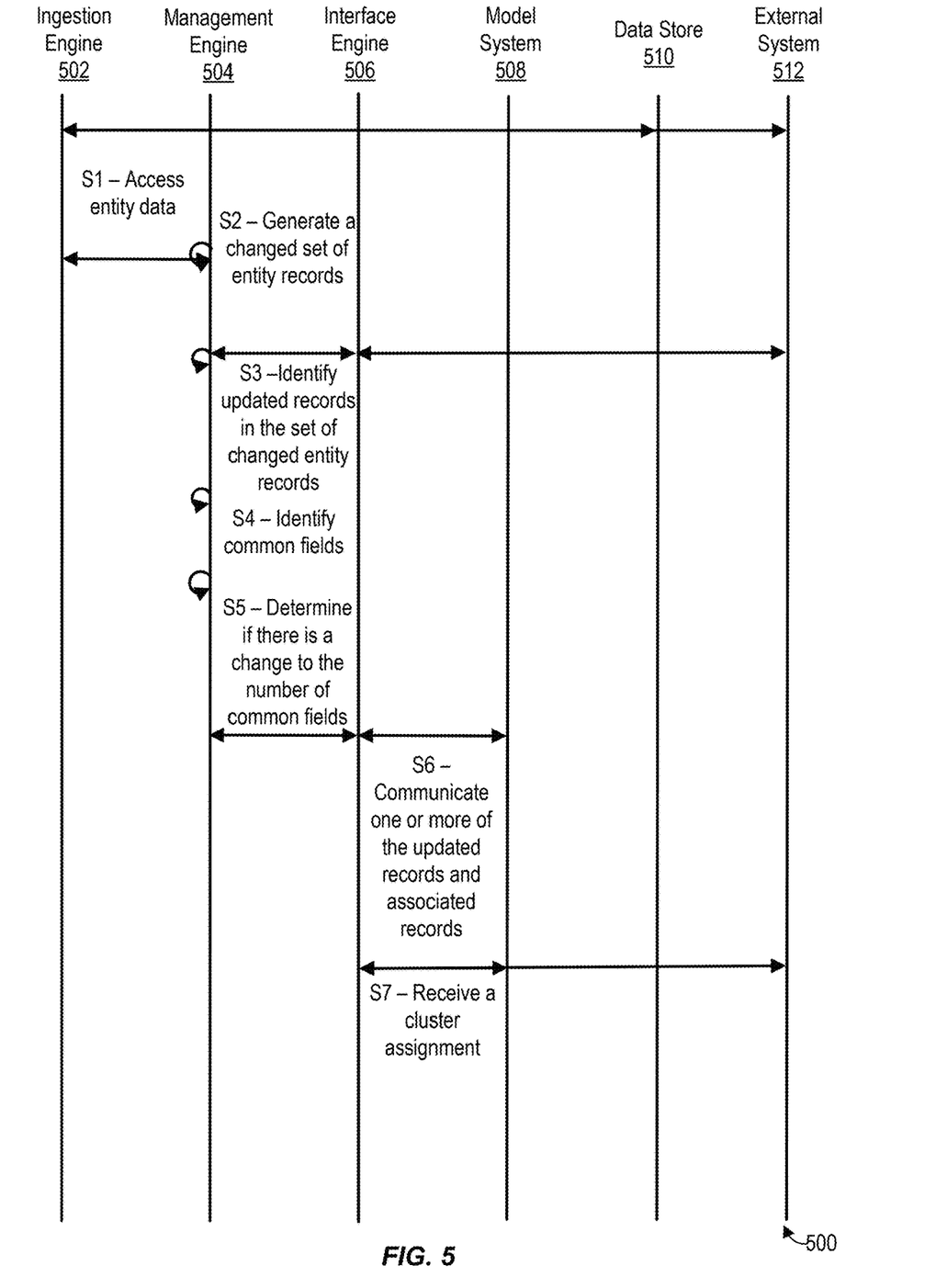
FIG. 5 is a sequence diagram showing a technique for filtering entity record data according to at least one embodiment.

FIG. 5 is a sequence diagram 500 showing a technique for filtering entity record data according to various embodiments. At S1, an ingestion engine 502 can access entity data. The entity data may be accessed from a data store 510 (e.g., data 403-409) of the record system. The entity data may be received from an external system 512 (e.g., from a local bank branch or a online banking system).

At S2, a management engine 504 can generate a set of changed entity records. The set of changed entity records can be generated using the entity data that was accessed by the ingestion engine 502 and the ingestion engine may communicate this data to the management engine 504. The set of changed entity record can be generated by updating entity records based on the entity data and retaining these updated records in the set of changed entity records. The set of changed entity records can include associated records that are assigned to the same cluster as at least one updated record. The associated records may not be updated in some embodiments. The management engine may retain an un-updated version of the set of changed entity records.

At S3, the management engine 504 may identify updated records in the set of changed entity records. The updated records may be records for which at least one field has been updated in response to the entity data from S1. In some embodiments, a record may only be an updated record if a change has occurred to a subset of the record fields. The subset of record fields can be identified from information received from an external system 512 (e.g., a user device). The information may be received from the external system 512 via a user interface that is provided to the external system by the interface engine 506.

At S4, common fields can be identified for each cluster by the management engine 504. The common fields can be identified by comparing the characters of each field for each pair of associated entity records (e.g., entity records that are assigned to the same cluster). The fields may be common fields if a threshold number or percentage of a field's characters match (e.g., at least a threshold number of the same characters are in the same order within the field). The threshold number or percentage of characters can be specified in information that is received via the user interface from S3. The user interface can specify individual fields that are to be considered as potential common fields, and the threshold can be different for each field.

At S5, the management engine 504 can determine if there is a change to the number of common fields. The management engine 504 may determine a number of common fields for each cluster before the entity records are updated at S2 (e.g., a number of common fields between each unique pair of entity records in a cluster), and the common fields identified at S4 can be compared to the number of common fields before the update.

At S6, the management engine 504 can communicate one or more of the updated records to a model system 508 based on the change to the number of common fields identified at S5. The management engine 504 may communicate the updated records with any associated records. The records may be communicated to the model system 508 via the interface engine 506. The management engine 504 may communicate the entity records if the common fields for at least one pair of associated records: has changed, is below a threshold, and/or is below a weighted threshold. The weight for each field can be received via the user interface at S3.

At S7, a cluster assignment can be received at the interface engine 506. The cluster assignment can be a unique identifier and each associated record can have the same identifier. The cluster assignments can be provided to one or more external systems 512 via the interface engine 506.

Figure 6:
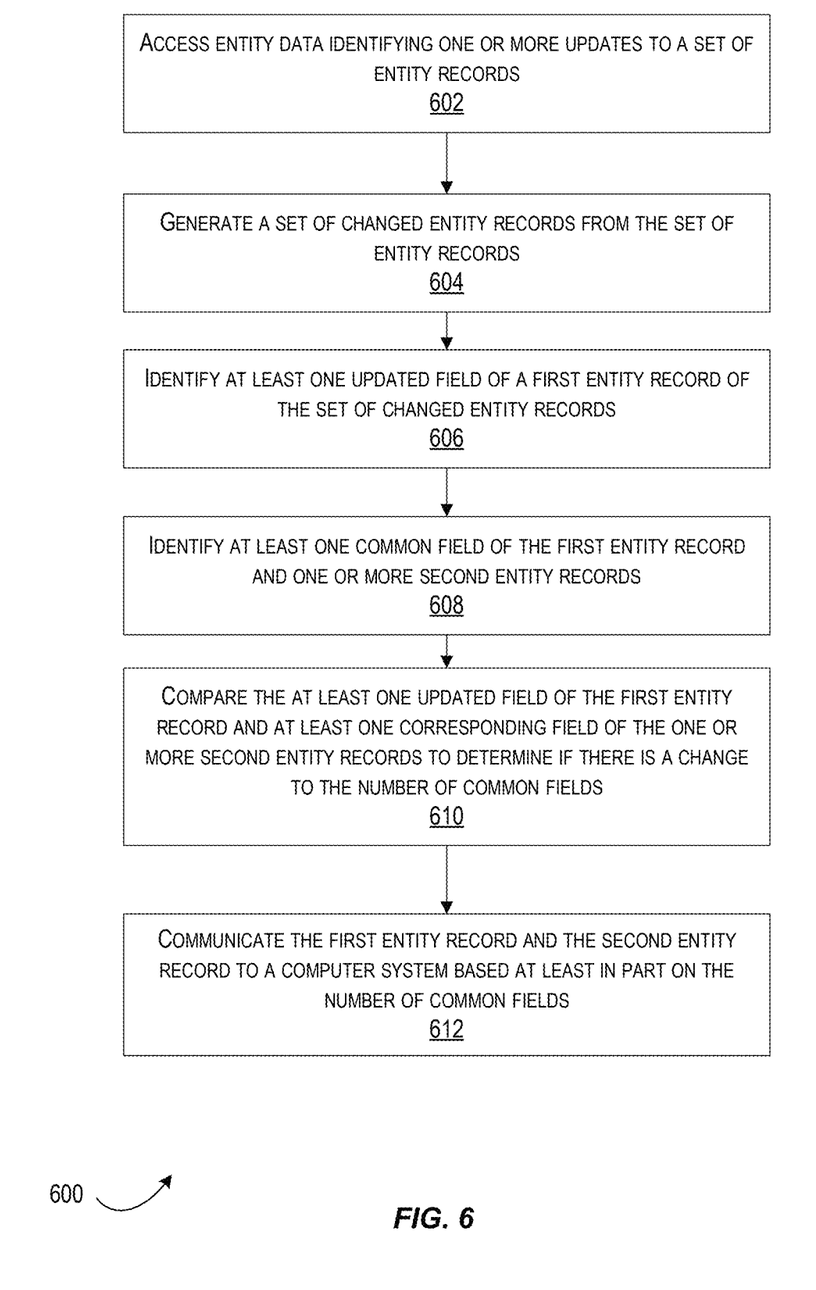
FIG. 6 is a block diagram illustrating an example method for filtering entity record data, in accordance with at least one embodiment.

FIG. 6 is a block diagram illustrating an example method 600 for near filtering entity record data, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion the Record System 102 of FIG. 1. In some embodiments, method 600 may be executed by components of record system 400 of FIG. 4. In some embodiments, method 600 may be executed by components of Computing Device 800 of FIG. 8.

The method 600, may begin at 602, entity data identifying one or more updates to a set of entity records can be received. The entity data can include data indicating updates to 1000 entity records, 2000 entity records, 5000 entity record, 10000 entity records, 15000 entity records, 20000 entity records, 30000 entity records, 40000 entity records, 50000 entity records, and 100000 entity records. The set of entity records can include 1 million entity records, 2 million entity records, 3 million entity records, 4 million entity records, 5 million entity records, 10 million entity records, and 15 million entity records.

At 604, a set of change entity records can be generated from the set of entity records. The set of changed entity record can be generated based at least in part on the entity data. The changed entity records can be generated at regular intervals. For example, the regular intervals can be 1 hour, 2 hours, 3 hours, 4 hours, 5 hours, 6 hours, 8 hours, 12 hours, 16 hours, 24 hours, 36 hours, 48 hours, and 72 hours. The set of changed entity records can include 1000 entity records, 2000 entity records, 5000 entity record, 10000 entity records, 15000 entity records, 20000 entity records, 30000 entity records, 40000 entity records, 50000 entity records, and 100000 entity records.

At 606, at least one updated field of a first entity record of the set of changed entity records. 606-612 can be performed for some or all of the entity records in the set of entity records.

At 608, at least one common field of the first entity record and the second entity record and one or more second entity records can be identified. The first entity record and the one or more second entity records can be associated with a first cluster based at lest in part on the number of common fields. Each common field may be weighted differently. For example, a street address field may be weighed more heavily than a middle name field. The weights for each field may be received via a user interface that is provided to a user device (e.g., user devices 112).

A first field of the at least one updated field of the first entity record and a second field of the one or more second entity records are a common field if a threshold number of characters in the first field and the second field overlap. Some or all of an entity record's fields may potentially be common fields. In some embodiments, a user interface can be presented to a user device, and input to the user device can select specific fields that are to be considered as potential common fields. The number of overlapping characters, or percentage of overlapping characters, that correspond to a common field can be specified via a user interface. The specified number or percentage of overlapping characters can be different for each field. Characters can overlap if they are the same alphanumeric character in the same order.

At 610, the at least one updated field of the first entity record and at least one corresponding field of the one or more second entity records can be compared to determine whether there is a change to the number of common fields. Common fields can include any combination of one or more address fields, one or more account fields (e.g., account numbers with an organization), one or more email address fields, one or more phone number fields, one or more name fields, and one or more government identification fields (e.g., social security number, drivers license number, and employer identification number).

At 612, the first entity record and the second entity record can be communicated to a computer system based at least in part on the number of common fields. The communication can be based at least in part on the number of common fields as well as the weight for each field in some embodiments. The computer system can be a model system (e.g., model system 440) or an external system (e.g., external system(s) 450). In some embodiments, the external system can return a cluster assignment for the entity records. For example, information indicating that the first entity record is associated with a second cluster can be received from the computer system. In some embodiments, information indicating that at least one of the one or more second entity records are associated with a third cluster can be received. In some embodiments, information indicating that the first entity record and the one or more second entity records are all associated with any of the first cluster, the second cluster, or the third cluster can be received.

Figure 7:
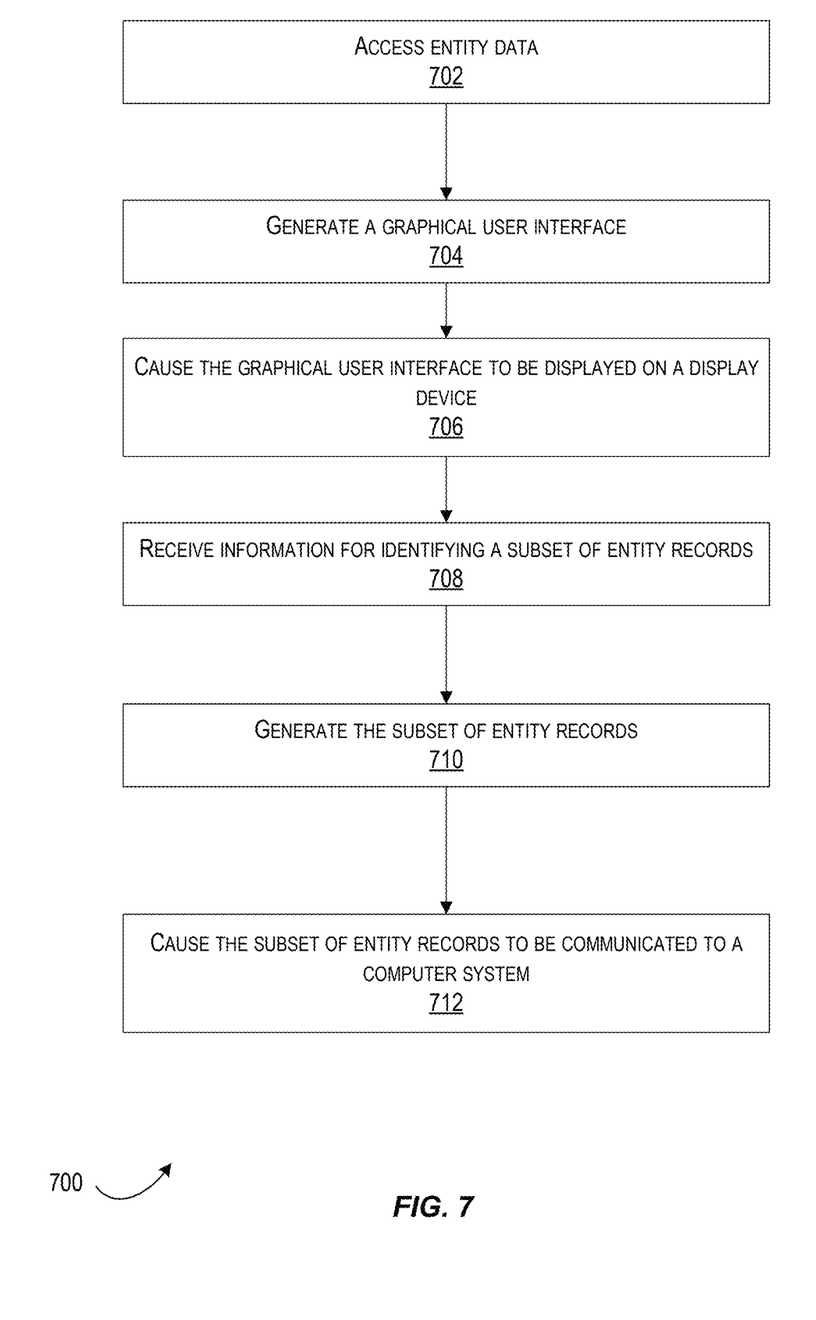
FIG. 7 is a block diagram illustrating an example method for a graphical user interface for filtering entity record data, in accordance with at least one embodiment.

FIG. 7 is a block diagram illustrating an example method 700 for a graphical user interface for filtering entity record data, in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 600 may include additional, or fewer operations than those depicted in FIG. 7. The operations of method 700 may be performed by any suitable portion the Record System 102 of FIG. 1. In some embodiments, method 700 may be executed by components of record system 400 of FIG. 4. In some embodiments, method 700 may be executed by components of Computing Device 800 of FIG. 8.

At block 702, the entity data can be accessed. The entity data can identify one or more updates to a set of entity records, and each entity record of the set of entity records can be assigned to a cluster of a plurality of clusters. The clusters may correspond to a mailing address in some embodiments. The entity records can include a plurality of fields, and the entity records can be accessed by a computing device.

At block 704, a graphical user interface can be generated. The graphical user interface can be generated by the computer device, and the interface can display the plurality of fields. Displaying the plurality of fields can mean that a category or label for the fields is displayed. For example, each field may be a key value pair and displaying the plurality of fields may include displaying the key for some or all of the fields.

At block 706, the graphical user interface can be displayed on a display device. The computer system may cause the display device to display the graphical user interface. For example, the computer system may provide instructions to a display device, and the instructions may cause the display device to show the graphical user interface. The display device may be a computing device such as a mobile phone, a laptop, a tablet computer, etc.

At block 708, information for identifying a subset of entity records can be received. The information can be received via the graphical user interface. The information identifying the subset of entity records can include information identifying one or more fields of the plurality of fields. For example, a user can provide input to the interface to select some or all of displayed fields. Selecting some or all of the displayed fields may mean selecting some or all of the keys that correspond to the plurality of fields. For example, a key may be "birthdate", and the value may be "11/11/1991". In such circumstances, the graphical user interface may display "birthdate" as a key that can be selected via the user interface. The information identifying the one or more fields of the plurality of fields can comprise a threshold for each field. The threshold can be a number of overlapping characters or a percentage of overlapping characters.

At block 710, the subset of entity records can be generated. Generating the subset of records can include determining a number of changed entity records for each cluster and adding the cluster's records to the subset of entity records based at least in part on the number of changed entity record fields for the cluster. An entity record can be a changed entity record if a threshold number of the record's fields are changed. An entity record field may be a changed entity record field if the field is selected at 708. The changed entity record can be determined by comparing the selected fields from 708 for each pair of entity records in a cluster. The entity records in a cluster may be compared if at least one of the entity records in the cluster includes a change to a selected field. If one entity record in a cluster is determined to be a changed entity record, then the entire cluster may be added to the subset of changed entity records. Comparing the fields may include determining a number of overlapping characters for each of the one or more fields to determine a number of common fields and adding the cluster to the subset of entity records based on the number of common fields. A cluster may be added to the changed entity records if the number of common fields is less than a common field threshold. Generating the set of entity records may include any of the blocks of method 600.

At block 712, the subset of entity records can be communicated to a computer system. The subset of entity records can be communicated over a network connection such as the internet.

Figure 8:
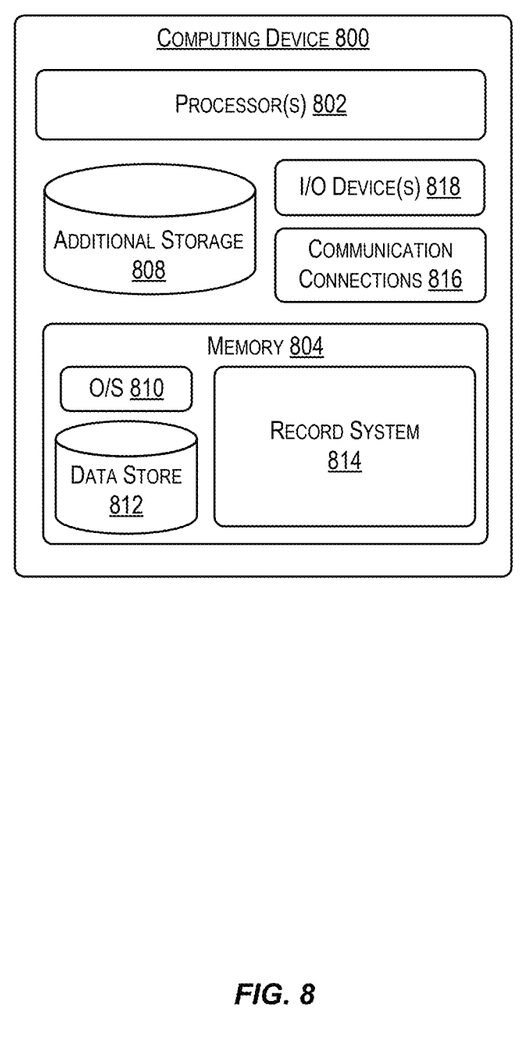
FIG. 8 illustrates an example computing device that may implement the methods disclosed herein.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 806, which may include removable storage and/or non-removable storage. The additional storage 806 may include, but is not limited to, magnetic storage, optical disks and/or tape storage. The disk drives and their associated computer-readable media may provide non-volatile storage of computer-readable instructions, data structures, program engines, and other data for the computing devices. In some implementations, the memory 804 or additional storage 806 may individually, or collectively, include multiple different types of memory, such as SRAM, DRAM, or ROM.

The memory 804 and/or additional storage 808 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 804 and the additional storage 808 are examples of computer storage media. Memory 804 and/or additional storage 808 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 804 may include an operating system 808 and one or more data stores 810, and/or one or more application programs, engines, or services for implementing the features disclosed herein, such as the features provided by the Record System 814 (an example of the record system 400 of FIG. 4).

The computing device may also contain communications connection(s) 816 that allow the computing device 800 to communicate with a stored database, another computing device, a server, user terminals and/or other devices (e.g., via one or more networks, not depicted). The computing device may also include I/O device(s) 818, such as a keyboard, a mouse, a pen, a voice input device, a touch input device, a display, speakers, a printer, etc.

Clustering can be used to identify related entities for householding. An organization may wish to identify entities that share a common address for various reasons. For example, a bank may wish to identify the entities sharing a household for marketing purposes. The bank may use identified households to mail marketing materials and to suggest particular products to the household members. A household can be identified by providing entity records to a machine learning model that is trained to perform clustering. The model may identify entity records as sharing a common address by clustering the records.

Clustering entity records can be computationally demanding and time consuming. The amount of computing resources that are required to process entity records can increase with the number of records that are input to the model. The processing time for the records may increase as the size of the model's input grows. In addition, the model may execute on a remote server, and reducing the input size can increase the amount of available bandwidth within the bank's computer systems.

The bank can reduce the number of entity records that are input to the machine learning model by filtering entity records. Instead of inputting all entity records, the bank can filter the records to identify changed records. For example, change data capture techniques can be used to identify updated records. These updated records, and any associated entity records that are part of the same cluster as a changed record, can be provided as input to the machine learning model. This filtering can significantly reduce the amount of input, and the model can classify the filtered records in a shorter period of time, and using fewer computing resources, than would be possible if the unfiltered entity records were input to the model.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    accessing, by a computing device, entity data, wherein the entity data identifies one or more updates to a set of entity records, wherein a first entity record of the set of entity records comprises a plurality of fields, and wherein each entity record of the set of entity records is assigned to a cluster of a plurality of clusters;
    generating, by the computing device, a graphical user interface, wherein the graphical user interface is configured to display the plurality of fields;
    providing, by the computing device and to a display device, instructions that cause the graphical user interface to be displayed on the display device;
    receiving, by the computing device and via the graphical user interface, information (i) that identifies the first entity record of the set of entity records, (ii) that identifies one or more fields of the plurality of fields, and (iii) that identifies a threshold associated with each field of the one or more fields, wherein the threshold comprises a number of overlapping characters;
    generating, by the computing device, a subset of entity records from the set of entity records by, for each cluster
        comparing, for each pair of entity records in the cluster, the number of overlapping characters for each of the one or more fields to the threshold for each field to determine a number of common fields; and
        adding the entity records in the cluster to the subset of entity records based on the number of common fields; and
    causing, by the computing device, the subset of entity records be communicated to a computer system.

2. The method of claim 1, wherein each cluster of the plurality of clusters corresponds to a mailing address.

3. The method of claim 1, wherein generating the subset of entity records comprises, for each cluster:
    comparing the one or more fields of the plurality of fields for each entity record of the cluster to determine a number of changed entity record fields for the cluster; and
    adding the cluster to the subset of entity records based on the comparing.

4. The method of claim 1, wherein adding the cluster to the subset of entity records comprises:
    determining that the number of common fields is less than a common field threshold.

5. The method of claim 1, wherein the one or more fields comprise at least one of an address field, an account field, and an email address field.

6. The method of claim 1, wherein the information received via the graphical user interface further comprises (iv) a weight associated with each field of the one or more fields.

7. The method of claim 1, further comprising:
    receiving, by the computing device and from the computer system, a cluster assignment for at least one entity record of the subset of entity records.

8. A computing device, comprising:
    one or more memories; and
    one or more processors in communication with the one or more memories and configured to execute instructions stored in the one or more memories to perform operations to:
        access, by the computing device, entity data, wherein the entity data identifies one or more updates to a set of entity records, wherein a first entity record of the set of entity records comprises a plurality of fields, and wherein each entity record of the set of entity records is assigned to a cluster of a plurality of clusters;
        generate, by the computing device, a graphical user interface, wherein the graphical user interface is configured to display the plurality of fields;
        provide by the computing device and to a display device, instructions that cause the graphical user interface to be displayed on the display device;
        receive, by the computing device and via the graphical user interface, information (i) that identifies the first entity record of a subset of entity records from the set of entity records, (ii) that identifies one or more fields of the plurality of fields, and (iii) that identifies a threshold associated with each field of the one or more fields, wherein the threshold comprises a number of overlapping characters;

generate, by the computing device, the subset of entity records from the set of entity records by, for each cluster compare, for each pair of entity records in the cluster, the number of overlapping characters for each of the one or more fields to the threshold for each field to determine a number of common fields; and add the entity record in the cluster to the subset of entity records based on the number of common fields; and cause, by the computing device, the subset of entity records be communicated to a computer system.

9. The computing device of claim 8, wherein each cluster of the plurality of clusters corresponds to a mailing address.

10. The computing device of claim 8, wherein generating the subset of entity records comprises operations to, for each cluster:

comparing the one or more fields of the plurality of fields for each entity record of the cluster to determine a number of changed entity record fields for the cluster; and adding the cluster to the subset of entity records based on the comparing.

11. The computing device of claim 8, wherein adding the cluster to the subset of entity records comprises operations to:

determine that the number of common fields is less than a common field threshold.

12. The computing device of claim 8, wherein the one or more fields comprise at least one of an address field, an account field, and an email address field.

13. The computing device of claim 8, wherein the information received via the graphical user interface further comprises (iv) a weight associated with each field of the one or more fields.

14. The computing device of claim 8, wherein the one or more memories store additional instructions that cause the one or more processors to perform operations to:

receive, by the computing device and from the computer system, a cluster assignment for at least one entity record of the subset of entity records.

15. A non-transitory computer-readable medium storing a plurality of instructions that, when executed by one or more processors of a computing device, cause the one or more processors to perform operations to:

access, by the computing device, entity data, wherein the entity data identifies one or more updates to a set of entity records, wherein a first entity record of the set of entity records comprises a plurality of fields, and wherein each entity record of the set of entity records is assigned to a cluster of a plurality of clusters;

generate, by the computing device, a graphical user interface, wherein the graphical user interface is configured to display the plurality of fields;

provide, by the computing device and to a display device, instructions that cause the graphical user interface to be displayed on the display device;

receive, by the computing device and via the graphical user interface, information (i) that identifies the first entity record of a subset of entity records from the set of entity records, (ii) that identifies one or more fields of the plurality of fields, and (iii) that identifies a threshold for each field of the one or more fields, wherein the threshold comprises a number of overlapping characters;

generate, by the computing device, the subset of entity records from the set of entity records by, for each cluster:

compare, for each pair of entity records in the cluster, the number of overlapping characters for each of the one or more fields to the threshold for each field to determine a common number of fields;

add the entity records in the cluster to the subset of entity records based on the number of common fields; and cause, by the computing device, the subset of entity records be communicated to a computer system.

16. The non-transitory computer-readable medium of claim 15, wherein each cluster of the plurality of clusters corresponds to a mailing address.

17. The non-transitory computer-readable medium of claim 15, wherein generating the subset of entity records comprises operations to, for each cluster:

comparing the one or more fields of the plurality of fields for each entity record of the cluster to determine a number of changed entity record fields for the cluster; and adding the cluster to the subset of entity records based on the comparing.

18. The non-transitory computer-readable medium of claim 15, wherein the one or more fields comprise at least one of an address field, an account field, and an email address field.

19. The non-transitory computer-readable medium of claim 15, wherein the information received via the graphical user interface further comprises (iv) a weight associated with each field of the one or more fields.

20. The non-transitory computer-readable medium of claim 15, wherein the one or more memories store additional instructions that cause the one or more processors to perform operations to:

receive, by the computing device and from the computer system, a cluster assignment for at least one entity record of the subset of entity records.

* * * * *